United States Patent
Healing et al.

(10) Patent No.: US 11,240,119 B2
(45) Date of Patent: Feb. 1, 2022

(54) NETWORK OPERATION

(71) Applicant: BRITISH TELECOMMUNICATIONS PUBLIC LIMITED COMPANY, London (GB)

(72) Inventors: Alexander Healing, London (GB); Michael Turner, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/749,151

(22) PCT Filed: Jul. 28, 2016

(86) PCT No.: PCT/EP2016/068119
§ 371 (c)(1),
(2) Date: Jan. 31, 2018

(87) PCT Pub. No.: WO2017/021290
PCT Pub. Date: Feb. 9, 2017

(65) Prior Publication Data
US 2018/0227190 A1    Aug. 9, 2018

(30) Foreign Application Priority Data

Jul. 31, 2015   (EP) .................................... 15179437

(51) Int. Cl.
*H04L 12/24* (2006.01)
*H04L 29/06* (2006.01)
(Continued)

(52) U.S. Cl.
CPC .......... *H04L 41/142* (2013.01); *G06F 16/285* (2019.01); *G06F 16/355* (2019.01); *H04L 63/1425* (2013.01)

(58) Field of Classification Search
CPC ... H04L 41/142; H04L 63/1425; H04L 12/24; H04L 29/06; G06F 17/30598;
(Continued)

(56) References Cited

U.S. PATENT DOCUMENTS

| | | |
|---|---|---|
| 5,361,351 A | 11/1994 | Lenkov et al. |
| 5,822,743 A | 10/1998 | Gupta et al. |

(Continued)

FOREIGN PATENT DOCUMENTS

WO    WO 2012/125137    9/2012

OTHER PUBLICATIONS

International Search Report for PCT/EP2016/068119, dated Sep. 29, 2016, 3 pages.
(Continued)

*Primary Examiner* — Minh Chau Nguyen
*Assistant Examiner* — Mehulkumar J Shah
(74) *Attorney, Agent, or Firm* — Nixon & Vanderhye P.C.

(57) ABSTRACT

A method of operating a communications network is disclosed. Modern communications networks produce vast amounts of network operational data which have the potential to provide a useful summary of the operational state of the network. Whilst processes such as clustering are known for arranging the vast amount of data into groups, the clusters themselves do not provide data which might be easily interpreted by network elements or administrators. Network operational data often comprises a plurality of data items, each of which gives a value for each of a set of attributes. By processing a cluster to identify attributes in the cluster whose values vary less in the cluster then they vary outside of the cluster, and then generating a cluster description which is based on a measure of the central tendency of the values of those attribute in the cluster, an easily interpretable general description of the data items in the cluster (Continued)

is provided. The easily interpretable general description of the cluster can then be used to relatively identify data items similar to those present in the cluster (e.g. from a larger database of data items), and elements in the network can then act autonomously on the basis of the cluster description to control the operation of the communications network.

29 Claims, 12 Drawing Sheets

(51) Int. Cl.
    *G06F 16/28* (2019.01)
    *G06F 16/35* (2019.01)
(58) Field of Classification Search
    CPC .. G06F 17/3071; G06F 16/355; G06F 16/285; G06F 17/30; G06F 16/35; G06F 16/28
    USPC .......................................... 709/223; 370/254
    See application file for complete search history.

(56) References Cited

U.S. PATENT DOCUMENTS

| | | | |
|---|---|---|---|
| 6,718,320 B1* | 4/2004 | Subramanian .... | G06F 16/24542 707/719 |
| 7,159,237 B2 | 1/2007 | Schneier et al. | |
| 7,999,809 B2 | 8/2011 | Beers et al. | |
| 8,028,337 B1* | 9/2011 | Xu .......................... | G06F 11/00 726/23 |
| 8,244,857 B2 | 8/2012 | Jakob | |
| 8,364,141 B1 | 1/2013 | Kateley | |
| 8,504,488 B2 | 8/2013 | Dutta | |
| 8,832,109 B2 | 9/2014 | Ghanea-Hercock | |
| 9,633,073 B1* | 4/2017 | Allen ..................... | G06F 16/245 |
| 10,091,668 B2 | 10/2018 | Kateley | |
| 10,389,641 B2 | 8/2019 | Turner et al. | |
| 2002/0133721 A1 | 9/2002 | Adjaoute | |
| 2003/0110398 A1 | 6/2003 | Dacier et al. | |
| 2006/0053035 A1 | 3/2006 | Eisenberg | |
| 2006/0116995 A1 | 6/2006 | Bloedorn | |
| 2006/0282425 A1 | 12/2006 | Aggarwal et al. | |
| 2007/0280114 A1* | 12/2007 | Chao ........................ | H04L 47/10 370/235.1 |
| 2008/0162533 A1 | 7/2008 | Mount et al. | |
| 2008/0270979 A1 | 10/2008 | McCool et al. | |
| 2008/0291918 A1 | 11/2008 | Turcot | |
| 2008/0320549 A1 | 12/2008 | Bertino et al. | |
| 2009/0172687 A1 | 7/2009 | Bobak et al. | |
| 2010/0150008 A1 | 6/2010 | Sohn et al. | |
| 2010/0228854 A1 | 9/2010 | Morrison et al. | |
| 2011/0055373 A1 | 3/2011 | Bnayahu et al. | |
| 2011/0098973 A1 | 4/2011 | Seidman | |
| 2011/0277034 A1 | 11/2011 | Hanson | |
| 2011/0282861 A1 | 11/2011 | Bergstraesser et al. | |
| 2012/0260201 A1* | 10/2012 | Ganesh .............. | G06Q 30/0201 715/764 |
| 2013/0157688 A1 | 6/2013 | Kateley | |
| 2013/0198022 A1 | 8/2013 | Zhang | |
| 2013/0246422 A1 | 9/2013 | Bhargava | |
| 2013/0304909 A1* | 11/2013 | Pappu ................. | H04L 61/6068 709/224 |
| 2013/0305357 A1 | 11/2013 | Ayyagari et al. | |
| 2013/0318015 A1 | 11/2013 | Dutta | |
| 2014/0129371 A1 | 5/2014 | Wilson | |
| 2015/0047034 A1 | 2/2015 | Burnham et al. | |
| 2015/0128263 A1 | 5/2015 | Raugas et al. | |
| 2015/0304346 A1 | 10/2015 | Kim | |
| 2015/0356174 A1 | 12/2015 | Narayana | |
| 2016/0224631 A1* | 8/2016 | James ................. | G06F 21/6227 |
| 2016/0226944 A1* | 8/2016 | Hsiao ................... | H04L 43/028 |
| 2016/0285707 A1 | 9/2016 | Pawlowski et al. | |
| 2018/0091377 A1 | 3/2018 | Turner | |
| 2018/0198718 A1 | 7/2018 | Turner et al. | |

OTHER PUBLICATIONS

International Search Report for PCT/EP2016/056959, dated Jun. 14, 2016, 3 pages.
International Search Report for PCT/EP2016/056962, dated Jun. 8, 2016, 4 pages.
Written Opinion of the ISA for PCT/EP2016/056959, dated Jun. 14, 2016, 8 pages.
Office Action dated Apr. 11, 2019, issued in Turner, U.S. Appl. No. 15/562,682, filed Sep. 28, 2017 (12 pages).
Office Action dated Sep. 10, 2018 issued in Turner, U.S. Appl. No. 15/563,018, filed Sep. 29, 2017 (15 pages).
Office Action dated Jan. 17, 2020 issued in Turner, U.S. Appl. No. 15/562,682, filed Sep. 28, 2017 (15 pgs.).
Sean Kandel, Jeffrey Heer, Catherine Plaisant, Jessie Kennedy, Frank van Ham, Nathalie Henry Riche, Chris Weaver, Bongshin Lee, Dominique Brodbeck, and Paolo Buono. 2011. "Research directions in data wrangling: visualizations and transformations for usable and credible data", Information Visualization 10, 4 (Oct. 2011), 271-288. DOI=10.1177/1473871611415994 http://dx.doi.org/10.1177/1473871611415994 (18 pages).
"BT simplifies big data and security challenges with new visualisation service", BT Press Release, Jun. 13, 2012 http://www.btplc.com/news/Articles/Showarticle.cfm?ArticleID=B91E1CD4-DF52-4 (2 pages).
"Type Inference", Wikipedia page printed Nov. 7, 2013, http://en.wikipedia.org/w/index.php/titie=Type_inference&printable=yes (4 pages).
Adaptive Similarity Metrics in Case-based Reasoning, J. Long, S. Stoecklin, D.G. Schwartz, and M.K. Patel, in proceedings Intelligent Systems and Control—2004.
B. J. Gao and M. Ester, "Turning Clusters into Patterns: Rectangle-Based Discriminative Data Description," Sixth International Conference on Data Mining (ICDM'06), Hong Kong, 2006, pp. 200-211.
Boriah, S., Chandola, V., & Kumar, V. (2008). "Similarity Measures for Categorical Data: A Comparative Evaluation" In Society for Industrial and Applied Mathematics—8th SIAM International Conference on Data Mining 2008, Proceedings in Applied Mathematics 130 (pp. 243-254). (Society for Industrial and Applied Mathematics—8th SIAM International Conference on Data Mining 2008, Proceedings in Applied Mathematics 130; vol. 1) (12 pages).
BT Assure Analytics Data Sheet 2012 (3 pages).
BT Assure Log Retention Data Sheet, Aug. 2014 (4 pages).
BT Assure Threat Monitoring Data Sheet 2012 (4 pages).
C. Long, H. Shen, J. Li and J. Ge, "An SR-ISODATA algorithm for IDS alerts aggregation," 2014 IEEE International Conference on Information and Automation (ICIA), Hailar, 2014, pp. 92-97.
C. Mazzariello, "IRC Traffic Analysis for Botnet Detection," 2008 The Fourth International Conference on Information Assurance and Security, Naples, 2008, pp. 318-323.
Cisco IOS NetFlow Version 9 Flow-Record Format, White Paper, May 2011 (14 pages).
European Patent Application 15179437.7—extended European Search Report dated Jan. 18, 2016.
Extended European Search Report issued in EP15275102.0 dated Sep. 22, 2015 (7 pages).
K. Xu, Z. Zhang and S. Bhattacharyya, "Internet Traffic Behavior Profiling for Network Security Monitoring," in IEEE/ACM Transactions on Networking, vol. 16, No. 6, pp. 1241-1252, Dec. 2008.
Martin Ester, Hans-Peter Kriegel, Jörg Sander, and Xiaowei Xu. 1996. A density-based algorithm for discovering clusters a density-based algorithm for discovering clusters in large spatial databases with noise. In Proceedings of the Second International Conference on Knowledge Discovery and Data Mining (KDD'96), Evangelos Simoudis, Jiawei Han, and Usama Fayyad (Eds.). AAAI Press 226-231.
Mihael Ankerst, Markus M. Breunig, Hans-Peter Kriegel, and Jörg Sander. 1999. "OPTICS: Ordering Points to Identify the Clustering Structure". In Proceedings of the 1999 ACM SIGMOD international conference on Management of data (SIGMOD '99). ACM, New York, NY, USA, 49-60. DOI=http://dx.doi.org/10.1145/304182.304187 (12 pages).

(56) References Cited

OTHER PUBLICATIONS

P. Schroeter, J. Bigün, Hierarchical image segmentation by multi-dimensional clustering and orientation-adaptive boundary refinement, Pattern Recognition, vol. 28, Issue 5, 1995, pp. 695-70.
Paul F. Velleman & Leland Wilkinson (1993) "Nominal, Ordinal, Interval, and Ratio Typologies are Misleading", The American Statistician, 47:1, 65-72 (19 pages).
Saeed Salah, Gabriel Maciá-FernáNdez, and JesúS E. DíAz-Verdejo. 2013. Survey A model-based survey of alert correlation techniques. Comput. Netw. 57, 5 (Apr. 2013), 1289-1317.
Sarah J. Moody, "Automated Data Type Identification and Localization using Statistical Analysis Data Identification", Master of Science in Computer Science Thesis, Utah State University, 2008 (76 pages).
Stevens, S. S. (Jun. 7, 1946). "On the Theory of Scales of Measurement" Science, vol. 103, No. 2684 677-680 (4 pages).
Viau, Christophe (Jul. 17, 2012). "Hybrid Visualizations for Data Exploration". Thèse de doctorat électronique, Montréal, École de technologie supérieure (127 pages).
U.S. Appl. No. 15/562,682, filed Sep. 28, 2017 (34 pages).
U.S. Appl. No. 15/563,018, filed Sep. 29, 2017 (45 pages).
Office Action dated Jun. 26, 2020, issued in Turner, U.S. Appl. No. 15/562,682, filed Sep. 28, 2017 (18 pages).
Office Action dated May 11, 2020 issued in European Application No. 16 744 783.8 (5 pgs.).
Office Action dated Apr. 1, 2021 issued for European Application No. 16 717 108.1 (7 pages).
Written Opinion of the International Searching Authority dated Jun. 8, 2016 in International Application No. PCT/EP2016/056962 (5 pages).
U.S. Appl. No. 15/562,682, filed Sep. 28, 2017, Network Operation.
Office Action dated Feb. 23, 2021 issued in U.S. Appl. No. 15/562,682 (14 pages).

\* cited by examiner

| Destination Port | Destination IP Address | Duration | Source Port | Source IP Address | Source Bytes | Total Bytes | Total Packets | Record ID |
|---|---|---|---|---|---|---|---|---|
| 6881 | 147.032.084.118 | 0.00054 | 35982 | 098.196.224.125 | 66 | 126 | 2 | 1 |
| 6889 | 086.049.087.107 | 0.01957 | 42421 | 147.032.084.215 | 74 | 134 | 2 | 2 |
| 6889 | 086.049.087.107 | 0.02586 | 42422 | 147.032.084.215 | 74 | 134 | 2 | 3 |
| 6881 | 110.139.025.176 | 2.14542 | 2015 | 147.032.084.118 | 186 | 366 | 6 | 4 |
| 6881 | 147.032.084.118 | 1.10301 | 3103 | 089.246.211.121 | 222 | 402 | 6 | 5 |
| ⋯ | | | ⋯ | | | | ⋯ | ⋯ |
| 6881 | 077.227.218.044 | 8.91382 | 2045 | 147.032.084.118 | 186 | 186 | 3 | 80 |
| 6881 | 088.153.064.122 | 8.91459 | 2056 | 147.032.084.118 | 186 | 186 | 3 | 81 |
| 3389 | 147.032.087.151 | 0.00000 | 4935 | 063.134.191.018 | 66 | 66 | 1 | 82 |
| | 077.075.076.046 | 3.00034 | 38089 | 147.032.084.021 | 148 | 148 | 2 | 83 |
| 3126 | 147.032.085.100 | 8.99649 | 16795 | 119.245.053.130 | 234 | 234 | 3 | 84 |

Figure 4

| Destination Port | Nominal |
| Destination IP Address | IP Address |
| Duration | Quantitative |
| Source Port | Nominal |
| Source IP Address | IP Address |
| Source Bytes | Quantitative |
| Total Bytes | Quantitative |
| Total Packets | Quantitative |

Figure 5

| Cluster ID | Destination Port | Destination IP Address | Duration | Source Port | Source IP Address | Source Bytes | Total Bytes | Total Packets | Record ID |
|---|---|---|---|---|---|---|---|---|---|
| 3.1.1 | 6881 | 147.032.084.118 | 0.00054 | 35982 | 098.196.224.125 | 66 | 126 | 2 | 1 |
| 3.1.1 | 3126 | 147.032.085.100 | 3.01419 | 54143 | 065.052.227.217 | 132 | 132 | 2 | 15 |
| 3.1.1 | 6881 | 147.032.084.118 | 0.00021 | 46985 | 098.196.224.125 | 66 | 126 | 2 | 56 |
| 3.1.1 | 3126 | 147.032.085.100 | 8.99649 | 16795 | 119.245.053.130 | 234 | 234 | 3 | 57 |
| 3.1.1 | 443 | 147.032.086.058 | 9.00154 | 50174 | 195.043.070.130 | 194 | 194 | 3 | 63 |
| 3.1.1 | 3126 | 147.032.085.100 | 9.0525 | 13468 | 119.245.053.130 | 234 | 234 | 3 | 69 |
| 3.1.1 | 3126 | 147.032.085.100 | 9.09556 | 38213 | 119.245.053.130 | 234 | 234 | 3 | 70 |
| 3.1.1 | 3126 | 147.032.085.100 | 8.99929 | 59959 | 066.160.174.224 | 222 | 222 | 3 | 73 |
| 3.1.1 | 3126 | 147.032.085.100 | 5.98173 | 36075 | 119.245.053.130 | 156 | 156 | 2 | 78 |
| 3.1.1 | 3126 | 147.032.085.100 | 9.22088 | 54492 | 119.245.053.130 | 234 | 234 | 3 | 79 |
| 3.1.1 | 3126 | 147.032.085.100 | 3.05319 | 52733 | 065.052.227.217 | 132 | 132 | 2 | 84 |

Figure 7

| Cluster ID : 3.1.1 | Destination Port | Destination IP Address | Duration | Source Port | Source IP Address | Source Bytes | Total Bytes | Total Packets |
|---|---|---|---|---|---|---|---|---|
| Cluster Size | 11 | | | | | | | |
| Statistical Data Type | Nominal | IP Address | Q've | Nominal | IP Address | Q've | Q've | Q've |
| Average | 3126 | 147.032.085.100 | 6.04 | No Mode | 119.245.053.130 | 173.09 | 184.00 | 2.55 |
| Absolute Value of Difference from Mean for Item 1 | 1 | 0.250 | 0.67 | 1 | 1.000 | 0.89 | 0.56 | 0.55 |
| Absolute Value of Difference from Mean for Item 2 | 0 | 0.000 | 0.34 | 1 | 1.000 | 0.34 | 0.50 | 0.55 |
| …… | …… | …… | …… | …… | …… | …… | …… | …… |
| Absolute Value of Difference from Mean for Item 10 | 0 | 0.000 | 0.36 | 1 | 0.000 | 0.51 | 0.48 | 0.45 |
| Absolute Value of Difference from Mean for Item 11 | 0 | 0.000 | 0.33 | 1 | 1.000 | 0.34 | 0.50 | 0.55 |
| Sum of Deviations from Mean | 3 | 0.75 | 4.06 | 11 | 6 | 5.22 | 4.79 | 5.45 |
| Normalised Sum of Deviations from Mean | 0.27 | 0.07 | 0.37 | 1.00 | 0.55 | 0.47 | 0.44 | 0.50 |

Figure 11

| Cluster ID | Destination Port | Destination IP Address | Duration |
|---|---|---|---|
| 3.1.1 | 3126 | 147.032.085.100 | 6.04 |

Figure 12

NETWORK OPERATION

This application is the U.S. national phase of International Application No. PCT/EP2016/068119 filed 28 Jul. 2016, which designated the U.S. and claims priority to EP Patent Application No. 15179437.7 filed 31 Jul. 2015, the entire contents of each of which are hereby incorporated by reference.

BACKGROUND AND SUMMARY

The present invention relates to the operation of a communications network.

The number and variety of individual communications handled by a modern communications network is vast. In addition to carrying user communications, modern communication networks store and transmit a great deal of management traffic which relates to the operation of the network. Because there are a myriad of management functions which need to be performed in a modern communications network, and since those functions are in practice performed by equipment provided by various equipment manufacturers at various times over the past several decades, it is difficult in practice to present a network administrator with a useful overview of the state of the network on the basis of the management traffic in the network.

Extracting knowledge from large amounts of data is the goal of data mining. Clustering is a data mining technique, but whilst clusters tend to form based on some pattern in the data, clustering algorithms commonly produce sets of points as clusters, rather than representing knowledge as a readily understandable pattern. There have been some attempts to alleviate this problem. The paper 'Turning Clusters into Patterns: Rectangle-based Discriminative Data Description', presented by Byron J. Gao and Martin Ester in the proceedings of the Sixth International Conference on Data Mining, 2006 discusses the use of rectangle-based expressions (essentially a set of ranges of quantitative values of each of a plurality of dimensions, each data item having values for each dimension) to describe the set of points within a cluster. Because such descriptions are interpretable they can also be used as search expressions to retrieve the contents of the cluster from the dataset from which the cluster was derived.

US Patent application 2008/0162533 discusses the use of clustering to organise search results, followed by partitioning of some or all of the produced clusters around a boundary value of one of the attributes found in each result to produce groups. The patent application proposes that clusters should be provided with both a name and a description. That patent application states that the cluster description is essentially a query which reproduces the cluster from the original data, but makes no suggestion as to how such a description might be derived. The name of a group might be a term which is found in at least a majority of the data units in a group, or a name which is associated with a shared property of the data units. The name is chosen such that, for each group, most of the represented items have an attribute value that maps to the assigned name and most items not in the given group do not have an attribute value that maps to the assigned name.

A paper entitled 'Internet Traffic Behaviour Profiling for Network Security Monitoring', presented in the IEEE/ACM Transactions on Networking, vol. 14, no. 6, pp1241-1252, and a broadly similar U.S. Pat. No. 8,028,337 from the same authors (Kuai Xu, Zhi-Li Zhang, and Supratik Bhattacharyya), teaches a method of building behaviour profiles of Internet backbone traffic. The method uses data mining and entropy-based techniques to generate behaviour classes, each of which includes a set of specific structural models which provides a compact representation of the behaviour class.

According to the present invention, there is provided a method of operating a communications network comprising:
  accessing a plurality of network operational data items arranged into groups, each of said groups comprising a plurality of network operational data items, each of said network operational data items having a value for each of a plurality of attributes, and
  for each group:
    i) for each of said attributes:
      a) calculating a measure of central tendency of the values of said attribute; and
      b) calculating a measure of the variability of the values of said attribute;
    ii) identifying one or more attributes having values with a variability lower than a predetermined threshold; and
    iii) generating a description of the group based on the measure of central tendency found for the one or more identified attributes.

By operating a communications network to:
  access a plurality of network operational data items arranged into groups, each of said groups comprising a plurality of network operational data items, each of said network operational data items having a value for each of a plurality of attributes, and
  for each group:
    i) for each of said attributes:
      a) calculating a measure of central tendency of the values of said attribute; and
      b) calculating a measure of the variability of the values of said attribute;
    ii) identifying one or more attributes having values with a variability lower than a predetermined threshold; and
    iii) generating a description of the group based on the measure of central tendency found for the one or more identified attributes.
  a method of operating a communications network is provided which automatically generates a succinct description of the state of the communications network based on network operational data items generated within the network. Such a description can be used to control subsequent automatic management of entities in the communications network, for example.

In some embodiments, the method further comprises automatically generating a query from said description, and executing the query on a database of network operational data items. This has the advantage that the grouping process (which can place great demands on computational resource) can be carried out on a manageable amount of network operational data to provide a description of subsets of that manageable amount of network operational data. The query generated from a subset of interest can then be applied to a much greater amount of network operational data (such data is often produced and stored in vast quantities) to reveal network operational data items of interest using a process which uses far less computational resource than would be required were the grouping process to be run on the vast amount of network operational data directly.

In some embodiments, the method further comprises obtaining, in relation to one or more of said attributes, a data type indication indicating the type of data values provided for that attribute, said measure of central tendency and attribute variability calculations depending upon said data type indication.

By calculating said attribute average and attribute variability measures in a manner which depends upon the type of data values provided in association with a given attribute, attribute variability measures which can be usefully compared across attributes of different types are calculated, leading to a labelling of the groups of network data items which more accurately reflects the operation of the network.

BRIEF DESCRIPTION OF THE DRAWINGS

There now follows, by way of example only, a description of one or more embodiments of the invention. This description is given with reference to the accompanying drawings, in which:

FIG. 4 shows an example of a set of network operational data items received by the network coordinator;

FIG. 5 shows the statistical data type of values provided in association with each attribute name common to two example network operational data items;

FIG. 7 shows one of the clusters of network operational data items produced by a network operational data aggregator running on the network co-ordinator of FIG. 2;

FIG. 11 shows variability measures calculated for each attribute of the data cluster of FIG. 5; and FIG. 12 shows the use of averages of attributes found to have a low variability as descriptors of the cluster of FIG. 5.

DETAILED DESCRIPTION OF PRESENT EXAMPLE EMBODIMENTS

In a first embodiment, a network security system (FIG. 1) is used to deploy and provide a managed security service that monitors a customer's network activity using a customer network management node 20 which collects status data from monitored components and transmits that status data to a security operations centre 40 ("SOC").

The managed security service is not intended to replace but to supplement, and thereby render more effective, a customer's existing preventive security products. Such products, which can include firewalls, servers, routers, intrusion detection systems, and other security products, can generate millions of lines of audit information each day. Buried in all that information may be the footprints of ongoing network attacks or intrusions. The managed security service can help filter and analyze all of that audit information in real time to detect and then counter such attacks or intrusions.

Figure 1:
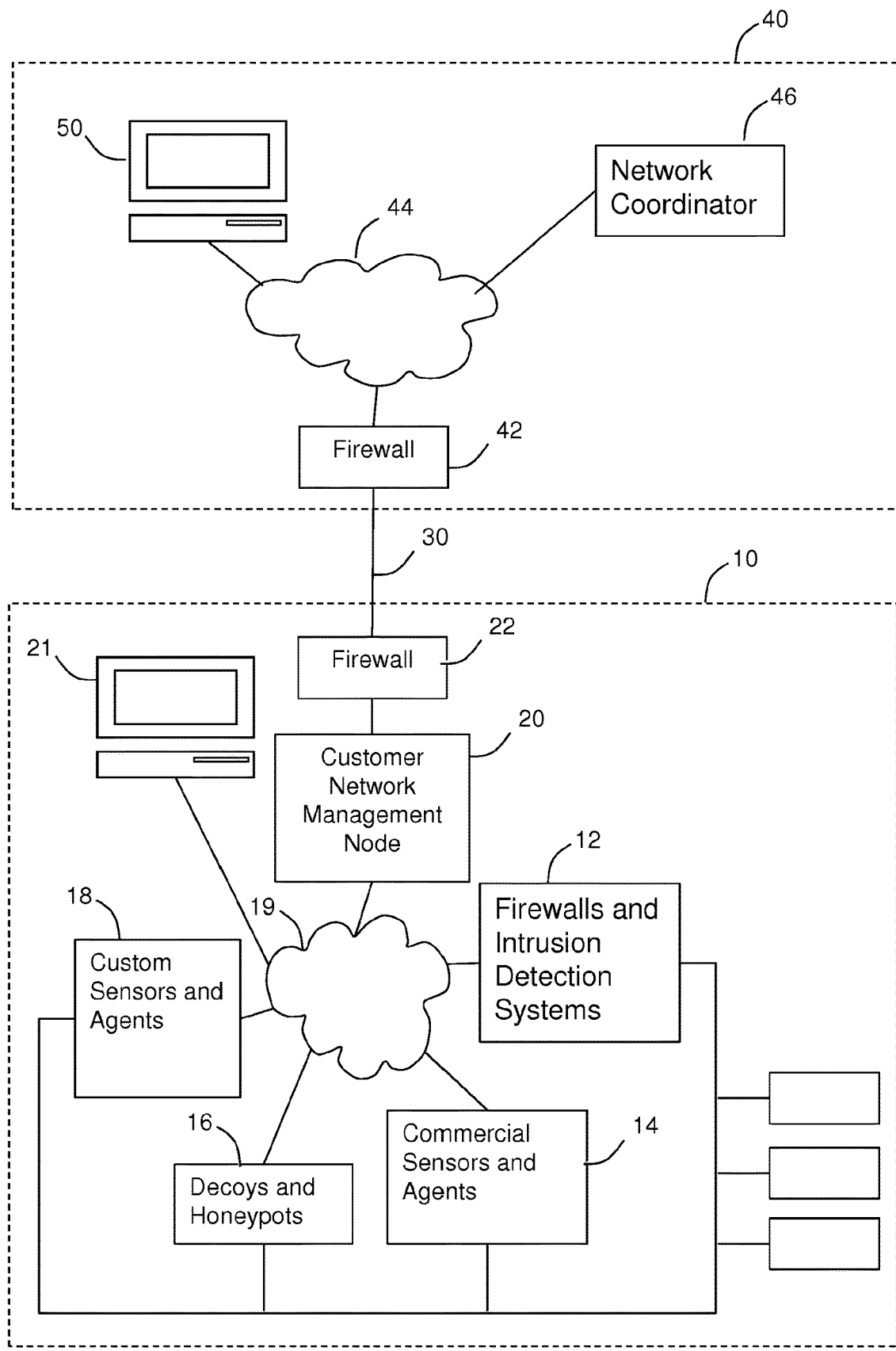
FIG. 1 shows a corporate network management system according to an embodiment of the present invention.

FIG. 1 is an overview of the systems deployed to provide the managed security service. FIG. 1 is divided into two portions: components and systems that operate on the customer site 10 (that is, within the customer's firewall 22) and components and systems that operate within the SOC 40 (that is, behind the SOC firewall 42). A single SOC can monitor and service multiple customer sites, and a single customer site can be monitored by multiple customer network management nodes. For ease in understanding, this discussion assumes a single SOC servicing a single customer site being monitored by a single customer network management node.

Customer network management node 20 monitors sensors attached to customer network 10 for evidence of potential security-related events happening on network 10. Such sensors can include firewalls and intrusion detection systems 12, commercially available sensors and agents 14, decoys and honeypots 16 (monitored devices or programs designed to attract the attention of, and thereby expose, a would-be intruder), and custom sensors and agents 18. More generally, customer network management node 20 can monitor and collect information from any network component that can be configured to send or provide to it status data (including audit log data and other audit information) concerning the status of network 10 and its components. The customer network management node 20 operates in accordance with configuration commands provided via administration console 21, which communicates with the customer network management node via internal communications network 19.

Both sensors and agents can monitor network components. However, while typically a sensor passively receives status data from network components set up to send such data to the sensor, an agent is designed to actively seek such data from the components it is monitoring. Sensors may include scanning engines, syslog data providers (including devices such as routers and firewalls), Simple Mail Transfer Protocol ("SMTP") sensors, Simple Network Management Protocol ("SNMP") sensors and SNMP traps. SNMP sensors generally require polling and may require additional software provided as part of the managed security service, whereas SNMP traps generally send data directly, without prompting. Sensors and agents may be customized for the particular needs of a customer's network, for example, to provide information not provided by those sensors and agents that are commercially available.

Customer network management node 20 collects the constantly updated status data it receives from sensors and agents, carries out administrative processing of the status data (including loading the status data into a generic data structure), and provides the processed status data to the security operations centre 40 for analysis (e.g., cross-customer analysis). As will be explained below, the customer network management node 20 may be updated during actual operation with network management policies or rules. Such updates can be sent from the SOC 40 to the customer network management node 20 and signed, verified and then securely installed. The updates can be controlled by network coordinator 46 within SOC 40.

The communications link 30 provides an encrypted, secure communications path and message protocol for messages sent back and forth between customer network management node 20 and the SOC 40. The communications protocol used over communications link 30 preferably runs inside a Transport Layer Security ("TLS") session or other protected path. Either side can send individual messages containing identification information and a payload.

The security operations centre 40 comprises a network coordinator 46, a firewall 42 and a network management console 50, all of which are interconnected via internal network 44. The network management console 50 provides an interface allowing a security analyst to interact with the network coordinator 46. The firewall 42 receives the communication link 30 from the customer network 10.

Figure 2:
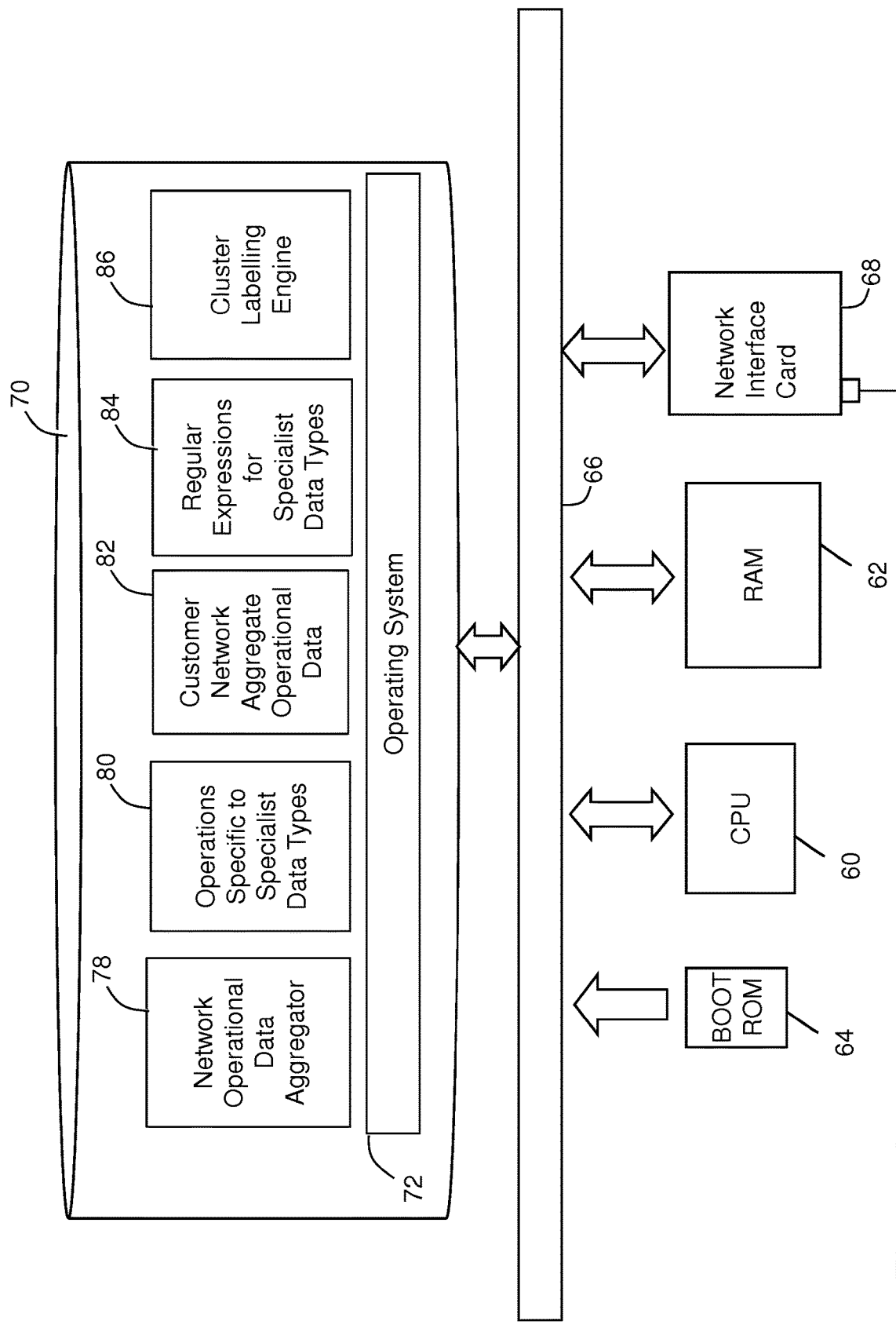
FIG. 2 shows the architecture of a network coordinator in the embodiment.

The network coordinator 46 comprises (FIG. 2) a central processing unit 60, a volatile memory 62, a read-only memory (ROM) 64 containing a boot loader program, and writable persistent memory—in this case in the form of a hard disk 70. The processor 60 is able to communicate with each of these memories via a communications bus 66.

Also communicatively coupled to the central processing unit 60 via the communications bus 66 is a network interface card 68. The network interface card 68 provides a communications interface between the network coordinator 46 and the internal network 44. Thus, the network interface card 68 provides a communications interface between the network coordinator 46, and, via the firewall 42 and the communications link 30, the customer network management node 20.

The hard disk 70 of the network coordinator 46 stores:
i) an operating system program 72,
ii) a network operational data aggregator 78, to which operations specific to specialist data types 80 can be added,
iii) customer network aggregate operational data 82, and
iv) a cluster labelling engine 86.

The network operational data aggregator 78 arranges the network operational data items arriving at the network co-ordinator 46 into groups. The customer network aggregate operational data 82 is generated by the network operational data aggregator 78. The operation of the automatic cluster labelling engine 86 will be explained below with reference to FIGS. 6 to 11.

Figure 3:
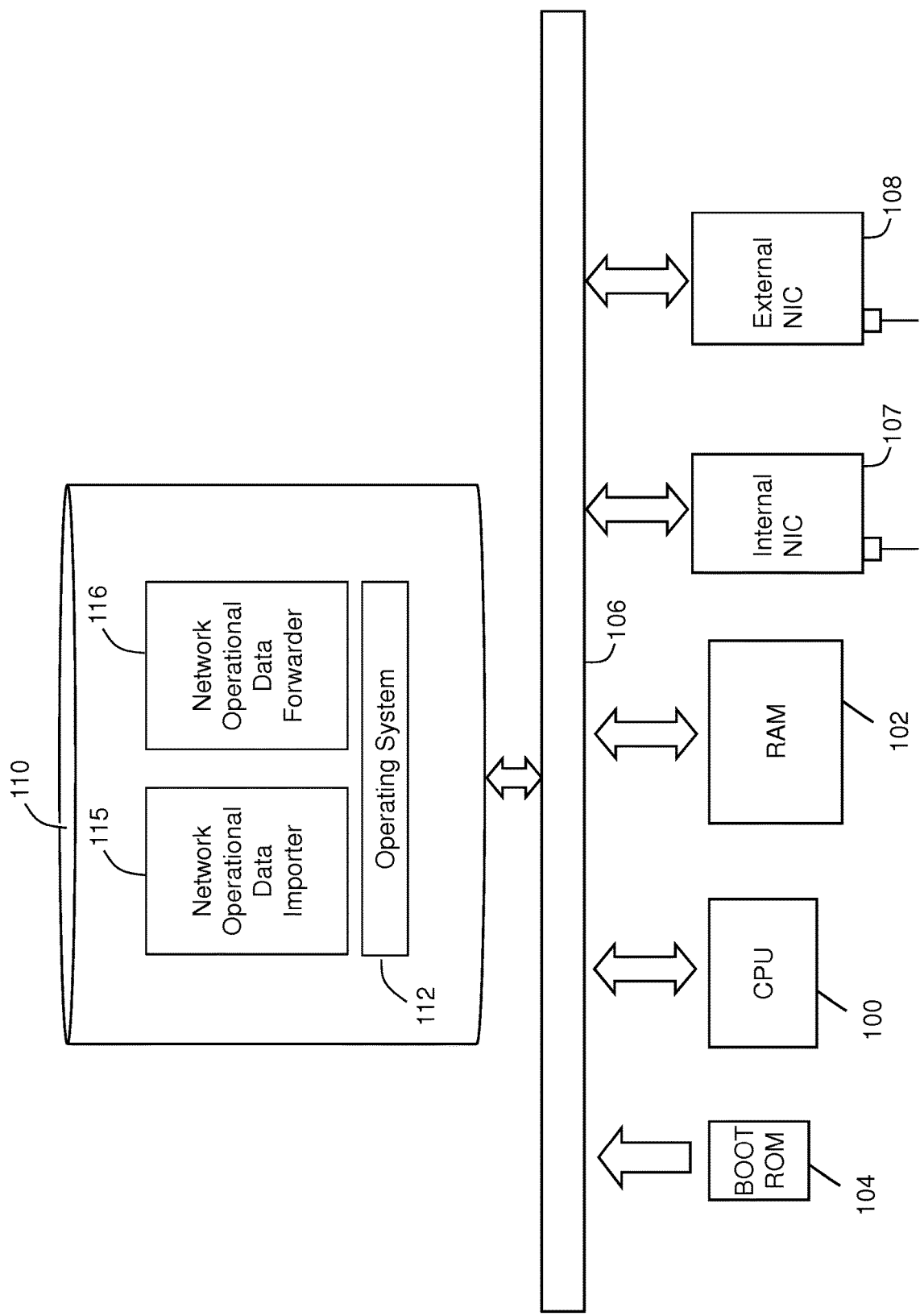
FIG. 3 shows the architecture of a customer network management node in the embodiment.

Turning now to the customer network 10, the customer network management node 20 comprises (FIG. 3) a central processing unit 100, a volatile memory 102, a read-only memory (ROM) 104 containing a boot loader program, and writable persistent memory—in this case in the form of a hard disk 110. The processor 100 is able to communicate with each of these memories via a communications bus 106.

Also communicatively coupled to the central processing unit 100 via the communications bus 106 are internal and external network interface cards 107, 108. The internal network interface card 107 provides a communications interface between the customer network management node 20 and the internal communications network 19. The external network interface card provides a communications interface between the customer network management node 20, and, via the firewall 22 and communications link 30, the security operations centre 40.

The hard disk 110 of the customer network management node 20 stores an operating system program 112, a network operational data importer 115, and a network operational data forwarder 116.

The network operational data importer 115 is arranged to receive or gather network operational data items from administrator-specified sources 12-18 within the customer site 10, and to process them in accordance with configuration instructions received from the administration console 21. The importer 115 can load data in a variety of formats, for example, Microsoft Excel spreadsheets, JavaScript Object Notation (JSON) files, XML files, comma-separated variable files or via a database connection. When the administrator specifies a source of network operational data, the administrator is able to select a subset of the attribute names for use in the automatic monitoring and control of the customer's network. The administrator can, of course, select all of the available sets of attribute values. In the present embodiment, for each of the selected sets of attribute values, the administrator provides, for each set of attribute values:

i) an attribute name (which might be different from an attribute name found in the source data);
ii) the statistical data type to be associated with the attribute name;
iii) where the statistical data type is quantitative, maximum and minimum values for the attribute; and
iv) where the statistical data type is ordinal and the values are non-numeric, an ordered list of the possible values of the attribute. From this, the network operational importer 115 is able to generate and store a mapping R(x) between values of the attribute and the corresponding rank. The network operational importer 115 is also able to store the maximum ($max_R$) and minimum ($min_R$) possible rank values for this attribute. An example of R(x) when the possible values are "low", "medium" and "high" would be:

$$R(x) = \begin{cases} 1, & \text{if } x \text{ equals "low"} \\ 2, & \text{if } x \text{ equals "medium"} \\ 3, & \text{if } x \text{ equals "high"} \end{cases}$$

The network operational data importer 115 loads each of the data items into a generic data structure.

The name given to each attribute in the generic data structure is, in this embodiment, the name specified by the administrator at the time the new data source was specified. This conversion from the attribute name given in the raw data an administrator-specified attribute name can aid in enabling the comparison of data items from different data sources.

The generic data structure is generic in that it includes an unordered list of one or more attribute name—attribute value pairs. The generic data structure also includes metadata (in this case a data item identifier).

It will be understood that the generic data structure is thus sufficiently flexible to allow the import of network operational data which comprises an arbitrary set of attribute names, and/or which provides a plurality of attribute values in association with a given attribute name. In this embodiment, each data item is converted into a generic data structure, before being forwarded by the network operational data forwarder 116 to the network coordinator 46. To give an example, the generic data structure for record 1 seen in FIG. 4 might take the following form (whilst this example is illustrated in JSON format, and hence the name-value pairs are separated by a colon, other formats using other delimiters could be used):

```
{
    "Id" : 1,
    "Data" :    [
                "Destination Port: 6881",
                "Destination IP Address: 147.32.84.118",
                "Duration: 0.00054",
                "Source Port: 35982",
                "Destination IP Address: 98.196.224.125",
                "Source Bytes: 66",
                "Total Bytes: 126",
                "Total Packets: 2"
                ]
}
```

It is to be noted that the data used in this application to explain the operation of the present embodiment are derived from a public dataset generated by Sebastian Garcia at the CVUT University, Prague, Czech Republic. One goal of the project which generated that public dataset is to store long-lived real botnet traffic and to generate labelled netflows files.

Each attribute within each data item has an associated statistical data type. This too can be specified by the administrator using the network operational data importer 115, and then provided to the network coordinator 46 as part of, or in association with, the generic data structure.

The network operational data forwarder 116 is arranged to forward the processed network operational data items (now in a generic data format) to the network coordinator 46 via the communications link 30.

An example of a statistical data type mapping stored for each network operational data item at the network coordinator 46 is shown in FIG. 5. The table indicates, for each attribute name, the statistical data type to be associated with that attribute name.

Various classifications of statistical data types are known in the art. One categorises a set of data as being 'nominal', 'ordinal' or 'quantitative'. 'Quantitative' data can in turn be further categorised into 'interval' type data or 'ratio' type data.

Sets of nominal data cannot be meaningfully ordered. For example, the magnitude of a TCP port number in a flow record is of no significance—each TCP port number could be replaced with an arbitrarily chosen name—hence TCP port numbers are a nominal data type.

By contrast, sets of ordinal data do have an inherent order. For example, the severity of a syslog message can have seven values as follows:

| Code | Severity | Description |
| --- | --- | --- |
| 0 | Emergency | System is unusable |
| 1 | Alert | Action must be taken immediately |
| 2 | Critical | Critical conditions |
| 3 | Error | Error conditions |
| 4 | Warning | Warning conditions |
| 5 | Notice | Normal but significant condition |
| 6 | Informational | Informational messages |
| 7 | Debug | Debug-level messages |

It should be noted that the values in both the 'code' column in the above table, and the values in the 'severity' column are examples of ordinal data. It will be understood then by those skilled in the art that the statistical data type of a set of data values relates to what the data is representing, rather than representing how the data is stored.

Sets of quantitative data go beyond ordinal data in that, in addition to having an inherent order, the numerical difference between different values has meaning too. For example, the IN_BYTES field of a Cisco IOS NetFlow Version 9 record is a numerical value representing the number of bytes associated with an IP flow. Since the difference between, say a 100 byte flow and an 80 byte flow is the same as the difference between a 40 byte flow and a 20 byte flow, such data is an example of quantitative data.

In addition to the above-listed statistical data types, the present embodiment allows a user to store regular expressions 84 which match specialist data types into the network coordinator 46. The present embodiment also allows a user to provide a programmatic description 80 of an operation which might be performed on the data of a given type. For example, a description of the calculation of a measure of the similarity (or, alternatively, the difference) between two IPv4 addresses might be provided by the user along with a regular expression enabling the recognition of an IPv4 address. As a further example, a description of a process for calculating an 'average' IPv4 address might be provided.

Other possible examples of specialist data types include commonly used date/time formats. Furthermore regular expressions matching data types important to a particular domain can be provided along with specialist operations which apply to the domain-specific data types. It will be understood that the advantage of recognising a new data type comes not only from recognising the actual data type but from using that knowledge to better analyse the data. For example, as will be explained below, a distance metric uniquely designed for IP addresses might be provided along with a regular expression for the IP address type in order to provide a more useful distance metric to use when examining the variations of values of an attribute within a dataset. Without the identification of IP addresses an accurate distance measure would not be applied and hence a calculated variability measure would not accurately reflect the true variability of the attribute in the records. As will be explained below, this would, in turn, lead to clusters of network operational data items being inaccurately labelled, and thus with a less accurate summary of the state of the customer's network being provided.

Whilst the network data items seen in FIG. 4 all accord with a common schema, it is to be understood that the data aggregation processes set out below are equally able to compare data items having different schemas.

The operation of the automatic network state summarisation process run by the network coordinator 46 will now be described with reference to FIGS. 6 to 12.

The process begins with the receipt 200 of a batch of network operational data items. Those data items are then arranged 202 into groups. The arrangement into groups might, for example, use the clustering techniques disclosed in the applicant's co-pending European patent application EP15275103 (applicant's internal reference A32615 EPp). An administrator might specify a subset of the attributes in the records as the attributes to be taken into account when finding groups or clusters of operational data items.

The arrangement into groups generates a hierarchy of clusters of data items. This is a containment hierarchy in which a parent cluster at a given level of the hierarchy contains a set of network operational data items, with the next level down in the hierarchy having a plurality of child clusters, each of which contains a distinct subset of the set of network operational data items found in the parent cluster in the level above. An example of a cluster of data items is seen in FIG. 7. The cluster includes a subset of the eighty-four records found in the batch of network operational data items illustrated in FIG. 4. The clustering 202 further adds a cluster identifier to each record—as seen in the leftmost column of FIG. 7.

The data identifying the clusters and the assignment of each network operational data item to a cluster forms the customer network aggregate operational data (FIG. 2: 82) in the present embodiment.

There is a need to automatically provide each cluster with a label which best characterises the network operational data items which the clustering algorithm has placed in the cluster.

Returning to FIG. 6, the automatic network state summarisation process continues with the automatic labelling 204 of each of the clusters generated by the clustering step 202.

Once the automatic cluster labelling is completed, the automatic network state summarisation process ends 206.

Figure 6:
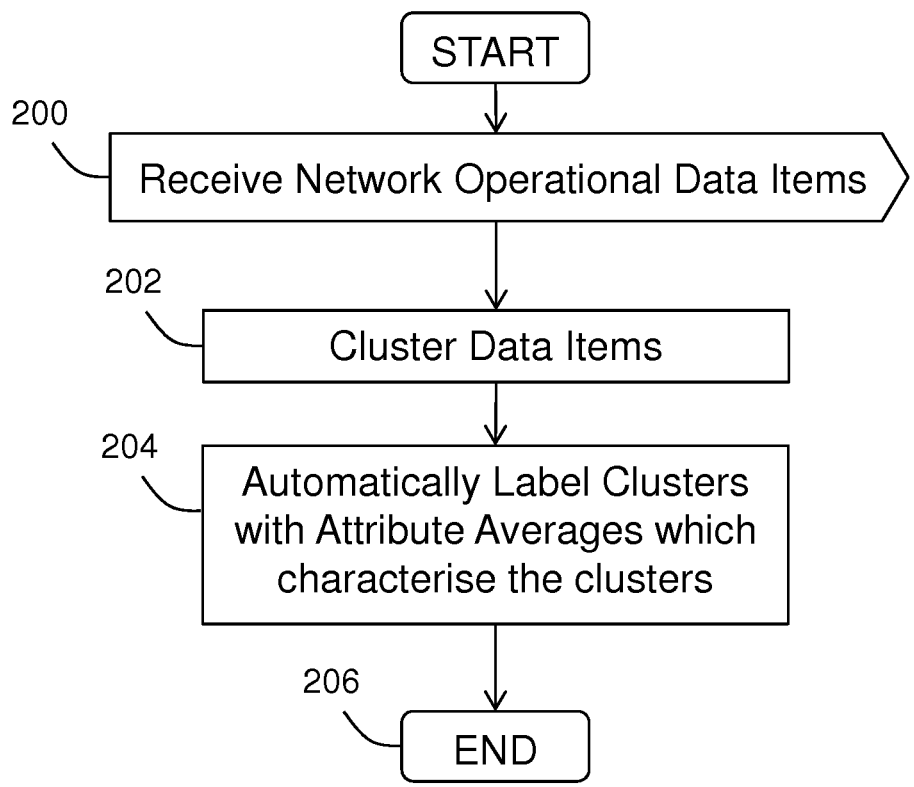
FIG. 6 shows a process for generating a summary of the state of the customer network.

The automatic cluster labelling process (FIG. 8) begins with the initialisation 210 of a current cluster pointer to the cluster at the top of the hierarchy of clusters generated by the clustering process (FIG. 6: 202). This initialisation 210 is followed by a sequence of steps (214-228) carried out for each cluster in the cluster hierarchy. In between iterations of the sequence of steps (214-228), the cluster pointer is moved 232 to the next node in a breadth-first traversal of the cluster hierarchy. Once the last cluster in the hierarchy has had a description prepared for it, the cluster labelling process ends 234.

The sequence of steps (214-228) carried out for each cluster in the cluster hierarchy begins with a nested sequence of steps (216, 218) carried out for each attribute in the cluster. The nested sequence of steps involves calculating 216 a measure of central tendency for the attribute, and calculating 218 a measure of the variability of values of the attribute within the cluster.

The calculation 216 of a measure of central tendency for the attribute depends upon the statistical data type to which the attribute belongs. If the attribute is nominal, then one or more modal values are used. If the attribute is ordinal, then the median is used. If the attribute is quantitative then the arithmetic mean is used (the harmonic or geometric mean might be calculated instead). In selecting a plurality of modal values, the number of times each value appears in that attribute for that cluster is found and all values that have a count greater than a constant fraction of the maximum count are taken to be modal values.

One of the operations (FIG. 2: 80) which an administrator might specify for a specialist data type is the calculation of a measure of central tendency. For example, for a specialist IP address data type, the measure of central tendency might not only be specified to include a number of modal values but could also find a number of modal values for each subsection of each value. So rather than finding just the value a.b.c.d the modal values of a.* and a.b.* and a.b.c.* and a.b.c.d appear might be found.

The next step in the nested pair of steps is the calculation 218 of a variability measure for each attribute in the cluster. The calculation 218 of the variability measure will now be described in more detail with reference to FIGS. 9 and 10.

The calculation begins with initialising 240 a variability measure for the current attribute to zero. This is followed by a sequence of calculations (244-246) carried out for each value of the attribute.

Figure 8:
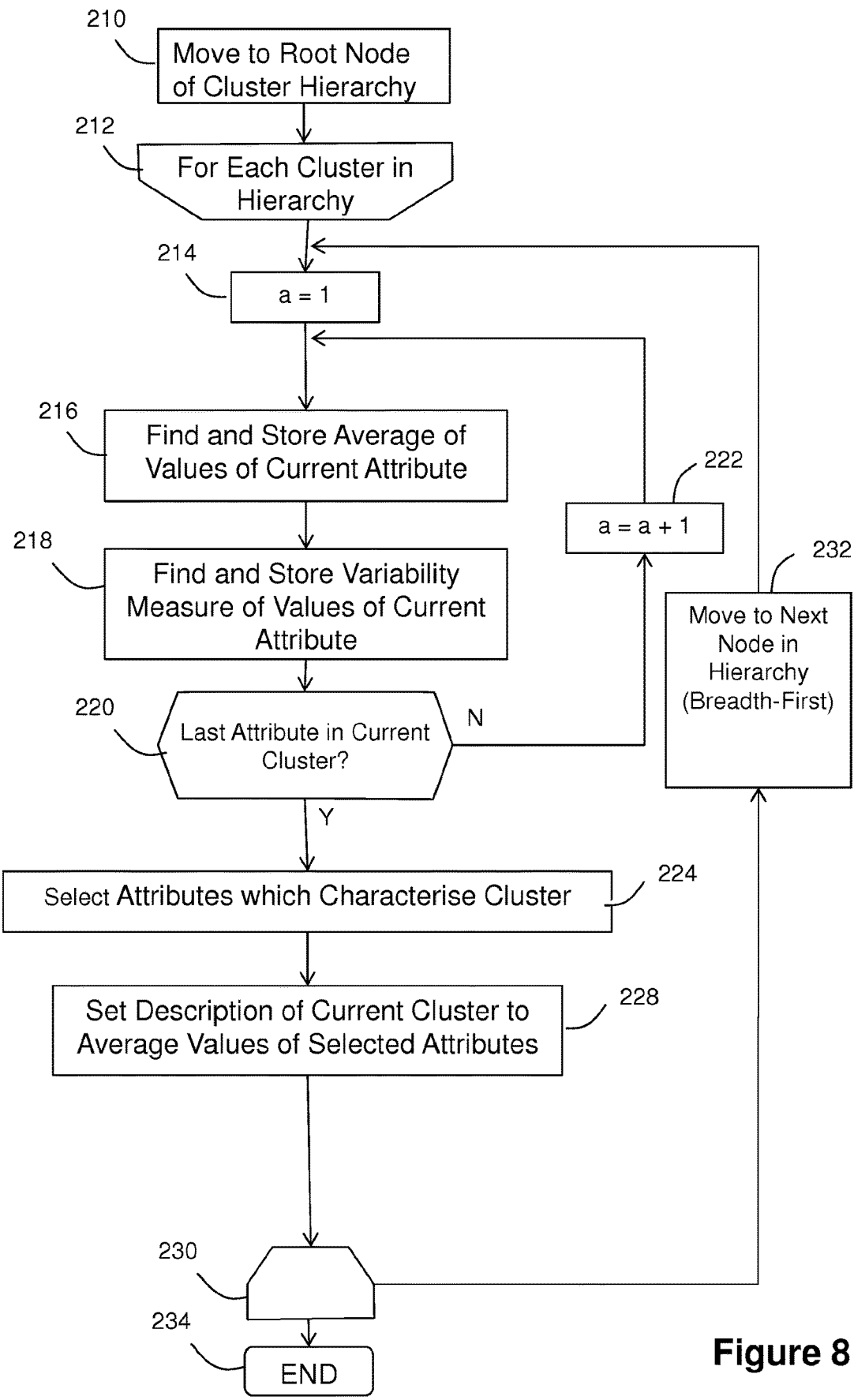
FIG. 8 shows a cluster labelling process operated by the network coordinator.
Figure 9:
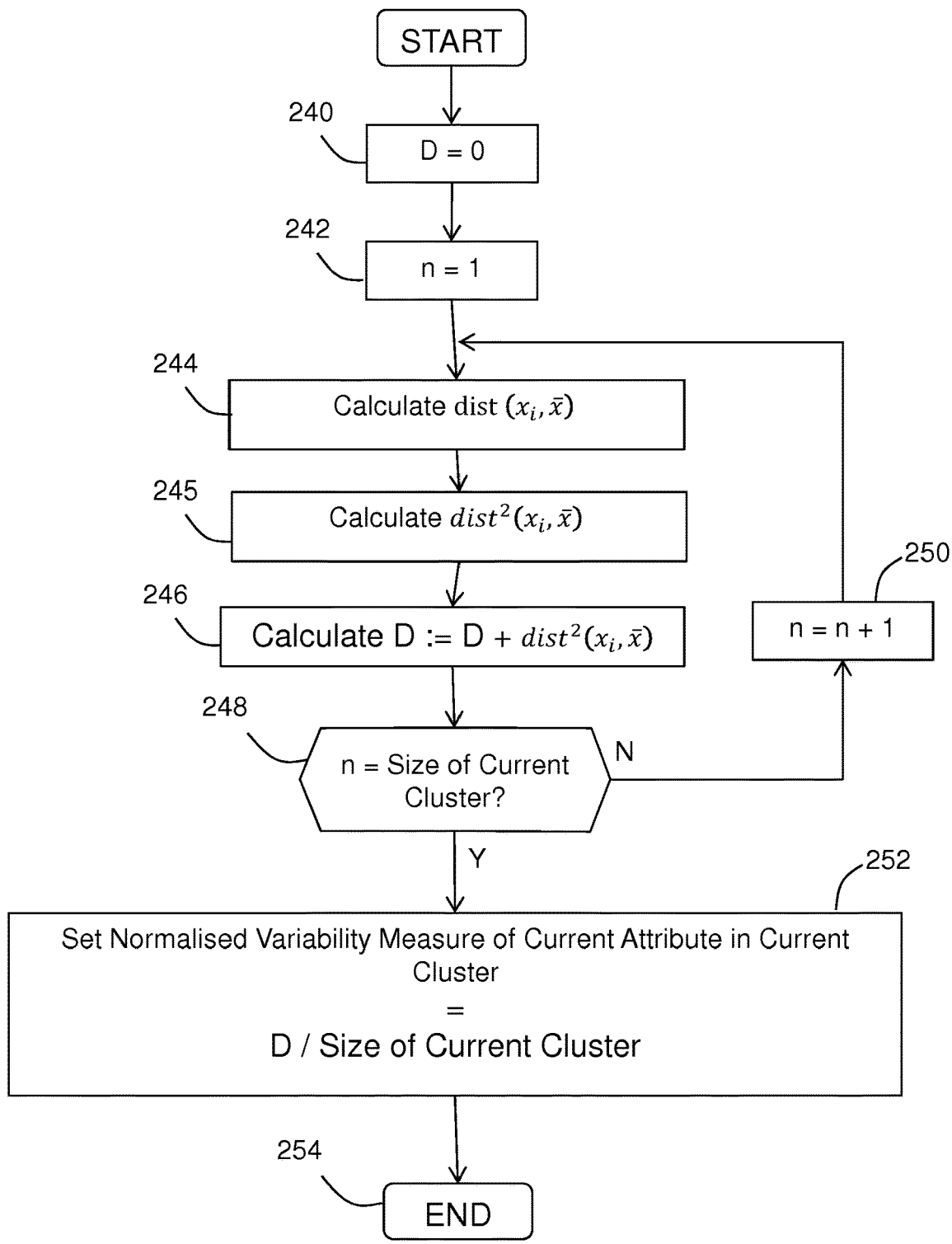
FIG. 9 shows the calculation of an attribute variability measure which forms part of the cluster labelling process of FIG. 8.

The first calculation 244 finds a distance measure between the current value of the attribute and the average value calculated for the attribute (FIG. 8: 216). As can be seen from FIG. 10, the way in which the distance measure is calculated depends upon the statistical data type associated with the current attribute name.

The attribute value similarity calculation function starts with the input 260 of the attribute value and the attribute average and the statistical data type provided for the current attribute name. An equality test 262 then finds whether the two attribute values are identical. If the two attribute values are identical then the function returns an attribute distance of 0 and ends. If the two attribute values are not identical, then a nullity test 266 is carried out. If one of the attribute values is null, then the function returns 268 one and ends. A series of tests (270-282) then applies an attribute value distance calculation (272-284).

When the statistical data type associated with the current attribute name is nominal, then the distance is simply calculated 272 to be zero if the two values are the same, or one if they are different.

$$\mathrm{dist}(a_i, b_i)_{nominal} = \begin{cases} 0, & a_i = b_i \\ 1, & a_i \neq b_i \end{cases} \quad \text{Equation 1}$$

In the case of an attribute name associated with values which are of an ordinal data type, the distance is calculated 276 as the rank difference between the two attribute values, divided by the rank difference between the highest ranked value of the attribute and the lowest ranked value of the attribute.

$$d_{ordinal} = \frac{|R(a_i) - R(b_i)|}{\max_R - \min_R} \quad \text{Equation 2}$$

In the case of an attribute name associated with values which are of a quantitative data type, the distance is calculated 270 as the absolute numerical difference between the two attribute values, divided by the range of attribute values calculated as the difference between the maximum and minimum attribute values given in relation to the current attribute name by the administrator:

$$d_{quantitative} = \frac{|a_i - b_i|}{\max - \min} \quad \text{Equation 3}$$

Like the attribute average calculation, the attribute distance measure calculation function is extensible in that modules can be added which provide an attribute distance measure calculation for specialist data types. For example, in the present embodiment, if the IP Address type test 282 finds that the values of the current attribute are of a specialist data type, for example IPv4 address, then the distance between the two addresses might be found by utilising a specialised function for finding the distance between the two IPv4 addresses. To give an example of such a specialist distance calculation function, the distance function for IPv4 addresses might return a result dependent upon the length of the match between the two IPv4 addresses, starting at the most significant bit of the address. If none of the four quadrants of the two IPv4 addresses match, then a distance value of one is returned. If the first quadrants match, but the second quadrants do not match, then a distance value of 0.5 is returned. If first and second quadrants match, but the third quadrant does not match, then a distance value of 0.25 is returned. If the first, second and third quadrants match, but the fourth quadrants do not match, then a distance value of 0.125 is returned. If the two IPv4 addresses are identical then a value of 0 will have been returned previously 264.

Returning to FIG. 9, once the distance between the current value of the attribute and the average of that attribute in the current cluster is found, it is squared 245, and added 246 to the variability measure D. It will be remembered that the calculation steps 244-246 are carried out for each value of the attribute found in the current cluster. Once every value in the current cluster has been considered, a normalised variability measure is calculated 252 by dividing the total variability D by the number of records found in the cluster.

In summary, the variability measure is calculated in accordance with equation 4 below.

$$\mathrm{var}(x, \bar{x}, \text{cluster } j) = \quad \text{Equation 4}$$

$$\frac{1}{\text{\# records in cluster } j} \sum_{x_i \text{ in cluster } j} \text{dist}^2(x_i, \bar{x})$$

Returning to FIG. 8, once the variability measure for each of the attributes has been found, attributes which characterise the cluster are selected 224. The process differs slightly between the topmost cluster and the other clusters. For the topmost cluster, the attribute with the lowest variability measure is found, and a boundary value is calculated to be (in this particular example) the sum of the lowest variability measure raised by a predetermined percentage and a predetermined constant. The average of any attribute whose variability is below the boundary value is then included 228 in the description of the topmost cluster. For clusters other than the topmost cluster in the hierarchy, the selection process is similar, but the boundary value is calculated differently. The attributes whose averages were selected to describe the parent cluster are ignored when seeking the attribute with the lowest variability measure, unless the variability of the attribute is significantly lower than the variability for that attribute in the parent cluster. Then, having identified the attribute with the lowest variability relative to the parent cluster, the boundary value is (as before) calculated to be a predetermined percentage greater than the variability of the identified attribute. As before, the average of any attribute whose variability is below the boundary value is then included 228 in the description of the cluster.

It will be remembered that the attribute variability calculation (FIGS. 9 and 10) is nested within the automatic cluster description process (FIG. 8) which is used in building the customer network aggregate operational data 82 stored at the network co-ordinator 46.

In practice, network operational data items are received at a rate which can mean that cluster descriptions can be produced in real-time.

An example of values which might be calculated in the generation of a description of the cluster whose elements are shown in FIG. 7, is shown in FIG. 11. In this particular example, the measure of variability calculated is the normalised sum of the absolute values of the distances between the attribute value for each data item and the 'average' value of that attribute in the cluster. Normalisation in this case involves dividing the sum by the number of data items found in the cluster.

Since in this particular example, it is assumed that the attributes 'Destination Port', 'Destination IP Address' and 'Duration' were not included in the description of the parent cluster, the 'average' values of those attributes (see the sixth row in the table) are used as the description of the cluster.

In a second embodiment, the cluster description is further used to generate a query (it is to be understood that the generated query might itself be provided as a description of the cluster).

As explained above the cluster description (FIG. 12) includes centre points—or averages—selected based on computed variance. This provides a mechanism for mapping between a cluster description and a query.

If the underlying statistical data type for an attribute is nominal, then the modal average is used. If there is only one value from this attribute in the cluster description then we query can simply include an equals statement on this value. If there is more than one value in the cluster description then the query can be value in the data must be equal to one of the values given (i.e. combined using the OR operator).

If an underlying statistical data type for an attribute is quantitative then the mean average is used. The variance in this attribute is then used to create a between statement—where the value in the data must be between the mean average (i.e. the description) minus the standard deviation of this attribute (or variance or some function of either) and the mean average plus the standard deviation of this attribute.

If an underlying statistical data type for an attribute is ordinal then the median average is used. In this case, essentially the same approach as is used in relation to quantitative values applies but rather than the values themselves the indexes of the values are used—with a subsequent conversion back to the values. For example if the values were numeric then we could use the same approach as the quantitative approach (although the measure of central tendency used will be different). If the values are not numeric then we use the function that maps between value and index that would have been used during the computations in getting the variance. The value for the description is converted into the corresponding index, the range of indexes using plus and minus the standard deviation is found, and then each index in the range is converted back into the values that can appear in the data. Then similar to the multi-modal example for nominal attributes an OR statement can be added to the query to select data records that have one of these values in the attribute in question.

If the data type is a bespoke type like IP address, then a specialist method to convert from description to query must be specified. For IP address, for example, the first part of an IP address (for example 193.168.*) might represent the description. A similar approach can be used as is used in relation to nominal data types but instead of using an equality statement a "begins with" statement is used—so if an IP address begins with the description then it is selected when (this part of) the query is executed. Note that in some cases there will be multiple descriptions from the same attribute—in which case multiple "begins with" statements could be combined with an OR operator.

Other bespoke data types might be things like dates/times—which can be treated similar to quantitative data types—or text fields which could be split on the spaces to get a list of words rather than one long string. Here the tf-idf measure could be used to select words for the textual (component of) the cluster description and then use a "contains" statement for the query.

The addition of a query generation step allows an administrator to run a clustering algorithm on a group of data items collected over a short time interval (say 15 seconds), identify a cluster which represents interesting behaviour, convert the description of that cluster to a query (possibly allowing the user to select or deselect parts of the query) and run the query on a group of data items collected over a much larger time interval (which could be as long as months). Those skilled in the art will appreciate that the computational demands made by clustering algorithms mean that this represents an efficient way to use available computing resources to identify network operational data items of interest.

In a third embodiment, the network coordinator is provided with a description of a cluster, in which a number of data items are suspected or known to represent malicious activity in the network. By applying a query based on the cluster description on a larger dataset (the network coordinator could store network operational data items gathered over many days or months, whilst the clustering process could be carried out on data gathered in a few seconds), or new data items (for example data items gathered in the last ten seconds), an automatic security controller present in the customer network management node can recognise data items representing malicious network activity in real-time, and take action to stop or degrade that malicious network activity (e.g. by stopping traffic being sent from a particular TCP port to a particular destination IP address).

Possible variations on the above embodiments include (this list is by no means exhaustive):

i) whilst in the above embodiments, a hierarchy of clusters was generated by the clustering process, in other embodiments a clustering algorithm which generates a non-hierarchical set of clusters might be used instead, with the labelling of each cluster being based merely on finding the attributes having the lowest variability in the cluster, or being based on finding attributes which have a variability within the cluster which is significantly lower than the variability of the values of the attribute in the dataset as a whole;

ii) In the above embodiments, attribute description data including:
 a) an attribute name;
 b) a statistical data type of the values given for the attribute; and
 c) a range for attributes whose values are of ordinal or quantitative statistical data types,
was used in classifying network operational data items. In alternative embodiments, the statistical data type and ranges might not be used, in which case the similarity calculation could simply test for equality of the two values—as seen in equation 1 above.

iii) In the above embodiments, the administrator provided a name, a statistical data type for each attribute, and a range of possible values for each attribute where those values are indicated to be of an ordinal or quantitative statistical data type. In other embodiments, one, two or all three of these might be derived automatically from the network operational data itself.

To obtain a name for each attribute automatically, the importer might find character strings in the input data which match predefined criteria. Many data items contain semantic markup which provides a character string which indicates what the values in each element of that data item mean. In files of records, each record consists of a fixed number of fields, each having a fixed format. The file can include a character string for each field which can indicate what the values in each field mean. For example, the importer 115 could extract attribute names from the headers of columns in a file or spreadsheet, or from the text in the XML tags surrounding the value in a data item written in an XML derivative. If no attribute name can be found in the source data, then a name can be automatically assigned to each attribute of the source data.

To obtain the statistical data type of attribute values given for an attribute name automatically, the importer might derive the statistical data types by looking at the statistical properties of the values of each attribute in the network operational data items, for example using the method set out in the applicant's co-pending patent application EP15275102 (applicant's reference A32604 EPp).

In the case of an attribute name which has associated values of an ordinal or statistical data type, a range for the possible values of the attribute could be obtained by finding the highest value and lowest value given for an attribute with that name in the current batch of data items and use those as the maximum and minimum values used in the distance calculation respectively.

iv) in the above embodiments, the network operational data comprised files of records, each having a fixed set of attribute values. In other embodiments, the data may be arranged in a different manner. For example, the data might arrive as a continuous stream of data items.

v) in the above embodiments, each cluster description did not include the averages used to describe the parent cluster in the description of the child cluster. In other embodiments, the averages used to describe the parent cluster would be included as well. The choice of which technique to adopt might be selectable by the user.

vi) In the embodiments described above, the network operational data was input to a hierarchical clustering algorithm directly. In other embodiments, the distances between all pairs of records might be calculated (using calculations similar to the calculations above and summing the results across the attributes), and a force-based clustering algorithm to locate the records in a two-dimensional space might be used. The co-ordinates of the records in that two-dimensional space might then be used as input into a hierarchical clustering algorithm, with the remainder of the method being as described above. Where a force-based clustering algorithm is used, a visual display showing each of the network operational data items as a point on the display (on which the clusters would appear as a bunch of closely-spaced points) might include overlay text which shows the cluster description. The average values selected to characterise the cluster might be accompanied by the name of the cluster. This will not always be necessary because the meaning of the average value might sometimes be self-evident from the value.

Figure 10:
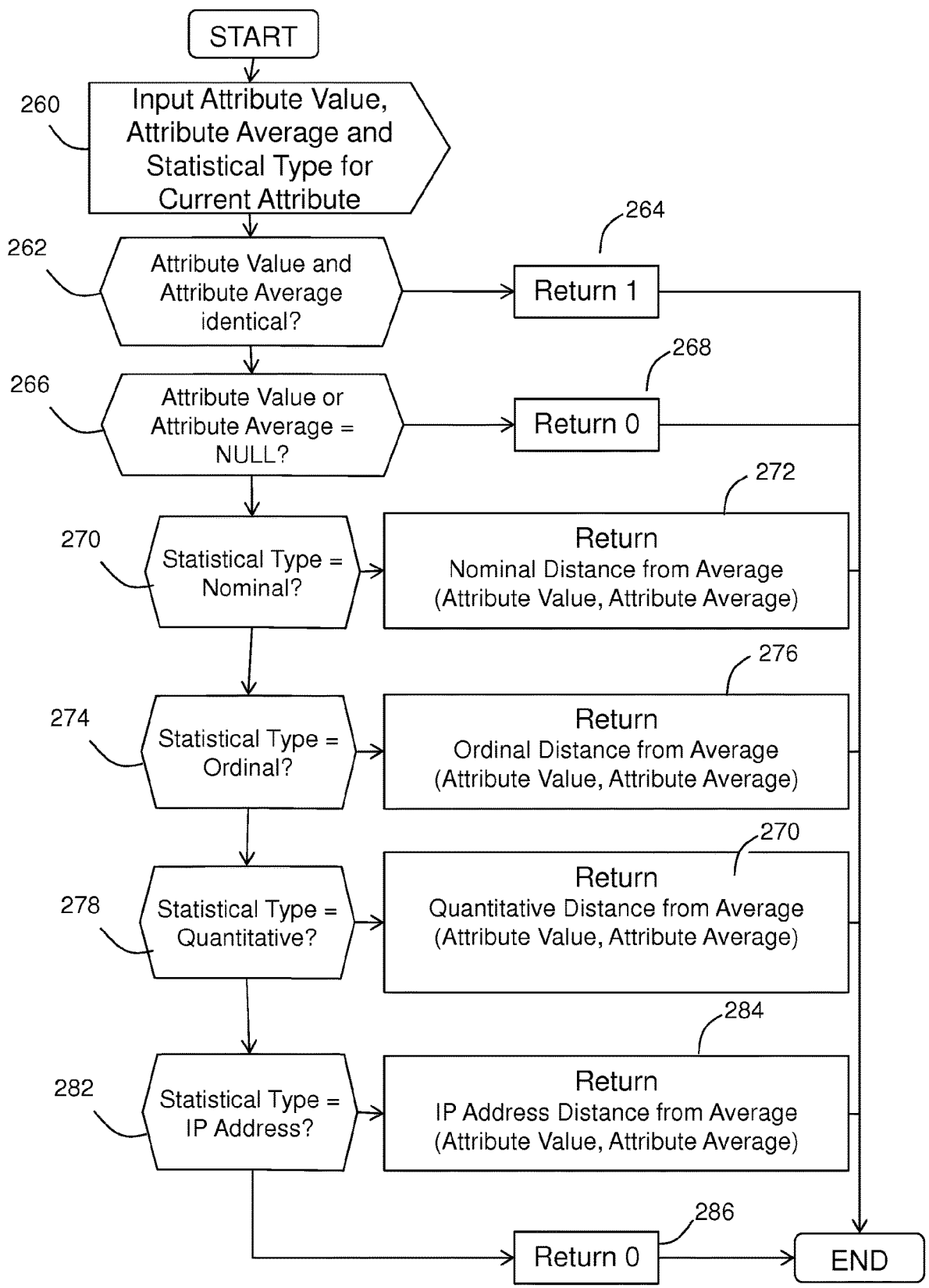
FIG. 10 shows how the calculation of attribute variability depends upon the statistical data type of values provided in association with the current attribute.

Such a display might allow the administrator or other user to zoom in—with the description of the topmost cluster being shown when zoomed out fully, and the descriptions of the descendant clusters of the topmost cluster being shown as the user zooms in.

vii) The above embodiments included a specific example (IPv4 address) of a specialist data type, and illustrated how such a specialist data type could be subject to a specialised distance measure rather than a similarity measure associated with the statistical data type of the values of the attribute. Other specialist data types could be specified, along with an indication or specification of a bespoke distance (or, alternatively, similarity) measure calculation suited to that specialist data type. For example, a specialist data type of English words could be defined, and a bespoke distance measure in that case might be a text similarity function that computes how similar two words are and returns a value between 0 and 1. This might include making a call to an external service to calculate a similarity between two words or two pieces of text. Any specialist data type for which a similarity or distance calculation can be provided could be added, other examples of possible specialised data types include product keys, or dates/times. Once a software module for carrying out the specialist similarity calculation is provided to the network co-ordinator 46, it can be used within the distance measure calculation (FIG. 10).

viii) In the above embodiments, an administrator is provided with a user interface which enables the administrator to select only a subset of the sets of attribute values found in a data item to be taken into account in calculating data item similarity. In other embodiments, this selection facility might not be provided, so that every one of the attributes in each of the data items being compared is considered when classifying network operational data items.

ix) In embodiments partway between relying on the administrator to provide an attribute name to be associated with a set of values, and deriving those names automatically from the input data item, the administrator might be asked to approve the attribute names automatically identified by the importer 115.

x) The customer network management node could filter (positively or negatively) messages from the various devices in the customer's network.

xi) In the above embodiments, the classification and reactive network control was carried out by the network coordinator 46. However, in other embodiments, the functions of the network coordinator might instead be carried out by the customer network management node 20—i.e. the managed security service might be deployed using only software and hardware installed at the customer site.

xii) the above embodiments could be combined with a reinforcement learning algorithm configured to learn what is of interest to the user. Using the interaction of the user (mouse clicks etc.), the algorithm could discover what the user finds interesting, and the system could then use the descriptions of the clusters in which the user appears to be interested to find other network operational data items or clusters of network operational data items which are likely to be of interest to the user.

Similarly, a reinforcement learning algorithm could learn what the users would do once they found a pattern in the data. So, for example, if the users found a certain type of attack coming from a certain location, they would know to take some form of action. The cluster description could then be associated with that certain type of attack, and the system could thereafter mimic the user reaction to that certain type of attack.

xiii) Whilst a variability measure which increased as the attribute values became more varied was found in the above embodiments, variability measures which decrease as the attribute values become more varied might be used instead (such a measure might alternatively be referred to as a similarity measure). For example, various functions could be used to convert each distance calculated in the above embodiment into a similarity. Such functions would be order-reversing (i.e. if a distance between a first pair of attribute values is greater than the distance between a second pair of attribute values then the similarity between the second pair of attribute values is greater than the similarity between the first pair of attribute values).

xiv) Whilst the above embodiments used a clustering algorithm to arrange the plurality of network operational data items into clusters, any algorithm that structures the data into partitions/groups, or indeed any data which has some structure/grouping could be reduced to a interpretable description using the method described above. Any structured data analysis technique could be used, but the above method is especially beneficial for data which has been organised using topic modelling, Community Detection, or SOMs.

In summary of the above disclosure, a method of operating a communications network is disclosed. Modern communications networks produce vast amounts of network operational data which have the potential to provide a useful summary of the operational state of the network. Whilst processes such as clustering are known for arranging the vast amount of data into groups, the clusters themselves do not provide data which might be easily interpreted by network elements or administrators. Network operational data often comprises a plurality of data items, each of which gives a value for each of a set of attributes. By processing a cluster to identify attributes in the cluster whose values vary less in the cluster then they vary outside of the cluster, and then generating a cluster description which is based on a measure of the central tendency of the values of those attribute in the cluster, an easily interpretable general description of the data items in the cluster is provided. The easily interpretable general description of the cluster can then be used to relatively identify data items similar to those present in the cluster (e.g. from a larger database of data items), and elements in the network can then act autonomously on the basis of the cluster description to control the operation of the communications network.

The invention claimed is:

1. A method of operating a communications network comprising:
   accessing a plurality of network operational data items arranged into groups, each of said groups comprising a plurality of network operational data items, each of said network operational data items having a value for each of a plurality of attributes, at least one attribute having an associated statistical data type indication indicating the statistical data type of data values provided for attribute is nominal and at least one another attribute having an associated statistical data type indication indicating the statistical data type of data values provided for attribute is quantitative, and
   for each group:
   i) for each of said attributes whose values are indicated to be of a nominal statistical data type:
   a) calculating a measure of central tendency of the values of said attribute that are indicated to be of the nominal statistical data type; and
   b) calculating a measure of the variability of the values of said attribute by performing a nominal attribute variability measure calculation specialized for attributes whose data are of the nominal statistical data type;
   ii) for each of said attributes whose values are indicated to be of a quantitative statistical data type:
   a) calculating a measure of central tendency of the values of said attribute that are indicated to be of the quantitative statistical data type; and
   b) calculating a measure of the variability of the values of said attribute by performing a nominal attribute variability measure calculation specialized for attributes whose data are of the quantitative statistical data type;
   iii) identifying one or more attributes having values with a variability lower than a predetermined threshold;
   iv) generating a description of the group based on the measure of central tendency found for the one or more identified attributes; and
   v) controlling an operation of the communications network using the generated description of the group.

2. The method according to claim 1 wherein controlling the operation of the communications network using the generated description of the group includes automatically generating a query from said description, and executing the query on a database of network operational data items.

3. The method according to claim 1 wherein said groups comprise clusters, said step of arranging said plurality of network operational data items into groups comprising clustering said plurality of network operational items into clusters using a clustering process.

4. The method according to claim 3 wherein said clustering process is a hierarchical clustering process which arranges said plurality of network operational data items into a containment hierarchy of clusters.

5. The method according to claim 1 wherein said description of the group comprises the measure of central tendency found for the one or more identified attributes.

6. The method according to claim 1 wherein the description of the group includes measures of central tendency of two or more attributes of different statistical data types.

7. The method according to claim 1 wherein controlling the operation of the communications network using the generated description of the group includes identifying other data items similar to those present in the group, and controlling the operation of the communications network using those identified other data items.

8. The method according to claim 1 wherein controlling the operation of the communications network using the generated description of the group includes applying a query based on the generated description on other data items, recognizing at least one of the other data items as representing a malicious activity, and stopping or degrading the malicious activity.

9. The method according to claim 1 further comprising automatically finding the statistical data type of the values of the attribute as nominal, ordinal or quantitative by statistically analyzing a plurality of the values of at least one of said attributes.

10. A method according to claim 1 in which at least one attribute has an associated statistical data type indication indicating the statistical data type of the data value provided for the attribute as ordinal, the method further comprising, for each group,
   for each of said attributes indicated to be of an ordinal statistical data type:
   a) calculating a measure of central tendency of the values of said attribute that are indicated to be of the ordinal statistical data type;
   b) calculating a measure of the variability of the values of said attribute by performing an ordinal attribute variability measure calculation specialized for attributes of the ordinal statistical data type.

11. A method according to claim 1, wherein: for each of said attributes whose values are indicated to be of the nominal statistical data type, calculating the measure of the central tendency of the values of said attribute that are indicated to be of the nominal statistical data type includes using one or more modal values of said attribute that are indicated to be of the nominal statistical data type; and
   for each of said attributes whose values are indicated to be of the quantitative statistical data type, calculating the measure of the central tendency of the values of said attribute that are indicated to be of the quantitative statistical data type includes using a mean of the values of said attribute that are indicated to be of the quantitative statistical data type.

12. A method according to claim 1, wherein:
   for each of said attributes whose values are indicated to be of the nominal statistical data type, performing the nominal attribute variability measure calculation specialized for attributes whose data values are of the nominal statistical data type includes calculating a distance measure between a current value and an average value of the attribute whose values are indicated to be of the nominal statistical data type by setting the distance measure between the current value and the average value of the attribute whose values are indicated to be of the nominal statistical data type to be a first value if the current value and the average value of the attribute whose values are indicated to be of the nominal statistical data type are the same, and setting the distance measure between the current value and the average value of the attribute whose values are indicated to be of the nominal statistical data type to be a second value if the current value and the average value of the attribute whose values are indicated to be of the nominal statistical data type are different, the first and second values being different from each other; and
   for each of said attributes whose values are indicated to be of the quantitative statistical data type, performing the quantitative attribute variability measure calculation specialized for attributes whose data values are of the quantitative statistical data type includes calculating a distance measure between a current value and an average value of the attribute whose values are indicated to be of the quantitative statistical data type by at least calculating an absolute difference between the current value and the average value of the attribute whose values are indicated to be of the quantitative statistical data type.

13. A computer-implemented method of automatically generating a description of the state of a communications network, said method comprising:
   accessing a plurality of network operational data items arranged into groups, each of said groups comprising a plurality of network operational data items, each of said network operational data items having a value for each of a plurality of attributes, at least one attribute having an associated statistical data type indication indicating the statistical data type of data values provided for attribute is nominal and at least one another attribute having an associated statistical data type indication indicating the statistical data type of data values provided for attribute is quantitative, and
   for each group:
   i) for each of said attributes indicated to be of a nominal statistical data type:
   a) calculating a measure of central tendency of the values of said attribute that are indicated to be of the nominal statistical data type; and
   b) calculating a measure of the variability of the values of said attribute by performing a nominal attribute variability measure calculation specialized for attributes whose data are of the nominal statistical data type;
   ii) for each of said attributes whose values are indicated to be of a quantitative statistical data type:
   a) calculating a measure of central tendency of the values of said attribute that are indicated to be of the quantitative statistical data type; and
   b) calculating a measure of the variability of the values of said attribute by performing a nominal attribute variability measure calculation specialized for attributes whose data are of the quantitative statistical data type;
   iii) identifying one or more attributes having values with a variability lower than a predetermined threshold; and
   iv) generating a description of the group based on the measure of central tendency found for the one or more identified attributes.

14. The computer-implemented method according to claim 13 further comprising automatically finding the statistical data type of the values of the attribute as nominal, ordinal or quantitative by statistically analyzing a plurality of the values of at least one of said attributes.

15. A computer-implemented method according to claim 13 in which at least one attribute has an associated statistical data type indication indicating the statistical data type of the data value provided for the attribute as ordinal, the method further comprising, for each group,
   for each of said attributes indicated to be of an ordinal statistical data type:

a) calculating a measure of central tendency of the values of said attribute that are indicated to be of the ordinal statistical data type;
b) calculating a measure of the variability of the values of said attribute by performing an ordinal attribute variability measure calculation specialized for attributes of the ordinal statistical data type.

16. A computer-implemented method according to claim 13 wherein: for each of said attributes whose values are indicated to be of the nominal statistical data type, calculating the measure of the central tendency of the values of said attribute that are indicated to be of the nominal statistical data type includes using one or more modal values of said attribute that are indicated to be of the nominal statistical data type; and for each of said attributes whose values are indicated to be of the quantitative statistical data type, calculating the measure of the central tendency of the values of said attribute that are indicated to be of the quantitative statistical data type includes using a mean of the values of said attribute that are indicated to be of the quantitative statistical data type.

17. A computer-implemented method according to claim 13 wherein:

for each of said attributes whose values are indicated to be of the nominal statistical data type, performing the nominal attribute variability measure calculation specialized for attributes whose data values are of the nominal statistical data type includes calculating a distance measure between a current value and an average value of the attribute whose values are indicated to be of the nominal statistical data type by setting the distance measure between the current value and the average value of the attribute whose values are indicated to be of the nominal statistical data type to be a first value if the current value and the average value of the attribute whose values are indicated to be of the nominal statistical data type are the same, and setting the distance measure between the current value and the average value of the attribute whose values are indicated to be of the nominal statistical data type to be a second value if the current value and the average value of the attribute whose values are indicated to be of the nominal statistical data type are different, the first and second values being different from each other; and for each of said attributes whose values are indicated to be of the quantitative statistical data type, performing the quantitative attribute variability measure calculation specialized for attributes whose data values are of the quantitative statistical data type includes calculating a distance measure between a current value and an average value of the attribute whose values are indicated to be of the quantitative statistical data type by at least calculating an absolute difference between the current value and the average value of the attribute whose values are indicated to be of the quantitative statistical data type.

18. Network control apparatus comprising:
a receiver arranged in operation to receive a plurality of network operational data items arranged into groups, each of said groups comprising a plurality of network operational data items, each of said network operational data items having a value for each of a plurality of attributes, at least one attribute having an associated statistical data type indication indicating the statistical data type of data values provided for attribute is nominal and at least one another attribute having an associated statistical data type indication indicating the statistical data type of data values provided for attribute is quantitative;
a processor arranged in operation to
for each group:
i) for each of said attributes indicated to be of a nominal statistical data type:
a) calculate a measure of central tendency of the values of said attribute that are indicated to be of the nominal statistical data type; and
b) calculating a measure of the variability of the values of said attribute by performing a nominal attribute variability measure calculation specialized for attributes whose data are of the nominal statistical data type;
ii) for each of said attributes indicated to be of a quantitative statistical data type:
a) calculating a measure of central tendency of the values of said attribute that are indicated to be of the quantitative statistical data type; and
b) calculating a measure of the variability of the values of said attribute by performing a nominal attribute variability measure calculation specialized for attributes whose data are of the quantitative statistical data type;
iii) identify one or more attributes having values with a variability lower than a predetermined threshold;
iv) generate a description of the group based on the measure of central tendency found for the one or more identified attributes; and
v) control an operation of a communications network using the generated description of the group.

19. The network control apparatus of claim 18 wherein the processor is configured to automatically generate a query from said description, and execute the query on a database of network operational data items.

20. The network control apparatus of claim 18 wherein said groups comprise clusters, said plurality of network operational data items are arranged into groups comprising clustering said plurality of network operational items into clusters using a clustering process.

21. The network control apparatus of claim 20 wherein said clustering process is a hierarchical clustering process which arranges said plurality of network operational data items into a containment hierarchy of clusters.

22. The network control apparatus of claim 18 wherein said description of the group comprises the measure of central tendency found for the one or more identified attributes.

23. The network control apparatus of claim 18 wherein the description of the group includes measures of central tendency of two or more attributes of different statistical data types.

24. The network control apparatus of claim 18 wherein to control the operation of the communications network using the generated description of the group, the processor is configured to identify other data items similar to those present in the group, and control the operation of the communications network using those identified other data items.

25. The network control apparatus of claim 18 wherein to control the operation of the communications network using the generated description of the group, the processor is configured to apply a query based on the generated description on other data items, recognize at least one of the other data items as representing a malicious activity, and stop or degrade the malicious activity.

26. The network control apparatus according to claim 18 wherein the processor is arranged in operation to automatically find the statistical data type of the values of the attribute as nominal, ordinal or quantitative by statistically analyzing a plurality of the values of at least one of said attributes.

27. Network control apparatus according to claim 18 in which at least one attribute has an associated statistical data type indication indicating the statistical data type of the data value provided for the attribute as ordinal, the being for arranged in operation, for each group, for each of said attributes indicated to be of an ordinal statistical data type:
a) calculate a measure of central tendency of the values of said attribute that are indicated to be of the ordinal statistical data type;
b) calculate a measure of the variability of the values of said attribute by performing an ordinal attribute variability measure calculation specialized for attributes of the ordinal statistical data type.

28. Network control apparatus according to claim 18 wherein: for each of said attributes whose values are indicated to be of the nominal statistical data type, calculating the measure of the central tendency of the values of said attribute that are indicated to be of the nominal statistical data type includes using one or more modal values of said attribute that are indicated to be of the nominal statistical data type; and for each of said attributes whose values are indicated to be of the quantitative statistical data type, calculating the measure of the central tendency of the values of said attribute that are indicated to be of the quantitative statistical data type includes using a mean of the values of said attribute that are indicated to be of the quantitative statistical data type.

29. Network control apparatus according to claim 18 wherein:

for each of said attributes whose values are indicated to be of the nominal statistical data type, performing the nominal attribute variability measure calculation specialized for attributes whose data values are of the nominal statistical data type includes calculating a distance measure between a current value and an average value of the attribute whose values are indicated to be of the nominal statistical data type by setting the distance measure between the current value and the average value of the attribute whose values are indicated to be of the nominal statistical data type to be a first value if the current value and the average value of the attribute whose values are indicated to be of the nominal statistical data type are the same, and setting the distance measure between the current value and the average value of the attribute whose values are indicated to be of the nominal statistical data type to be a second value if the current value and the average value of the attribute whose values are indicated to be of the nominal statistical data type are different, the first and second values being different from each other; and for each of said attributes whose values are indicated to be of the quantitative statistical data type, performing the quantitative attribute variability measure calculation specialized for attributes whose data values are of the quantitative statistical data type includes calculating a distance measure between a current value and an average value of the attribute whose values are indicated to be of the quantitative statistical data type by at least calculating an absolute difference between the current value and the average value of the attribute whose values are indicated to be of the quantitative statistical data type.

* * * * *